(12) United States Patent
Lobocki et al.

(10) Patent No.: US 10,502,233 B2
(45) Date of Patent: Dec. 10, 2019

(54) SYSTEM FOR AN INLET GUIDE VANE SHROUD AND BAFFLE ASSEMBLY

(71) Applicant: General Electric Company, Schenectady, NY (US)

(72) Inventors: Marcin Jacek Lobocki, Warsaw (PL); Wiktor Karol Wardecki, Milanowek (PL); Joseph Charles Kulesa, West Chester, OH (US); Maciej Staszewski, Warsaw (PL)

(73) Assignee: General Electric Company, Schenectady, NY (US)

( * ) Notice: Subject to any disclaimer, the term of this patent is extended or adjusted under 35 U.S.C. 154(b) by 481 days.

(21) Appl. No.: 15/336,831

(22) Filed: Oct. 28, 2016

(65) Prior Publication Data

US 2017/0191500 A1 Jul. 6, 2017

(30) Foreign Application Priority Data

Jan. 4, 2016 (PL) .......................................... 415534

(51) Int. Cl.
*F04D 29/54* (2006.01)
*F02C 3/04* (2006.01)
(Continued)

(52) U.S. Cl.
CPC .............. *F04D 29/542* (2013.01); *F02C 3/04* (2013.01); *F02C 7/04* (2013.01); *F04D 29/083* (2013.01);
(Continued)

(58) Field of Classification Search
None
See application file for complete search history.

(56) References Cited

U.S. PATENT DOCUMENTS 2,863,634 A 12/1958 Chamberlin et al.
3,703,081 A 11/1972 Krebs et al.
(Continued)

FOREIGN PATENT DOCUMENTS

CA 2 738 201 A1 4/2010
CN 101372902 A 2/2009
(Continued)

OTHER PUBLICATIONS

Search Report issued in connection with corresponding PL Application No. 415534 dated Mar. 1, 2017.
(Continued)

*Primary Examiner* — Igor Kershteyn
*Assistant Examiner* — Juan G Flores
(74) *Attorney, Agent, or Firm* — Dority & Manning, P.A.

(57) ABSTRACT

A system for an inlet guide vane shroud and baffle assembly includes a shroud. The shroud includes a first end configured to couple to an annular support member of the gas turbine engine, and a second end. The shroud also includes a distal end including an axially aft extending lip, and a seal assembly configured to form a seal with an annular set of rotating teeth on a rotor of the gas turbine engine. The shroud further includes an arcuate shroud body extending between the distal end and the second end. The shroud and baffle assembly also includes a baffle coupled to an aft side of the shroud. The baffle includes a radially outward end coupled to the aft side, a radially inward end coupled to the axially aft extending lip, and an arcuate baffle body extending there between. Both the shroud and the baffle extend circumferentially about a central axis.

20 Claims, 15 Drawing Sheets

(51) Int. Cl.
*F02C 7/04* (2006.01)
*F04D 29/08* (2006.01)
*F04D 29/32* (2006.01)

(52) U.S. Cl.
CPC ........ *F04D 29/325* (2013.01); *F05D 2220/32* (2013.01); *F05D 2240/35* (2013.01); *F05D 2250/712* (2013.01)

(56) References Cited

U.S. PATENT DOCUMENTS

| | | | |
|---|---|---|---|
| 4,087,199 A | 5/1978 | Hemsworth et al. | |
| 4,398,864 A | 8/1983 | Camboulives et al. | |
| 5,327,716 A | 7/1994 | Giffin, III et al. | |
| 5,328,327 A * | 7/1994 | Naudet | F01D 17/162 29/889.22 |
| 7,503,755 B2 | 3/2009 | Lai et al. | |
| 7,658,063 B1 | 2/2010 | Matheny | |
| 2011/0164967 A1 | 7/2011 | Elorza Gomez et al. | |

FOREIGN PATENT DOCUMENTS

| | | |
|---|---|---|
| EP | 0 018 892 A1 | 11/1980 |
| GB | 2 239 678 A | 7/1991 |

OTHER PUBLICATIONS

Extended European Search Report and Opinion issued in connection with corresponding EP Application No. 16196832.6 dated Jun. 8, 2017.
Machine Translation and First Office Action and Search issued in connection with corresponding CN Application No. 201610960765.9 dated May 17, 2018.
Canadian Office Action Corresponding to CA Application No. 2947368 dated Oct. 31, 2017.

* cited by examiner

SYSTEM FOR AN INLET GUIDE VANE SHROUD AND BAFFLE ASSEMBLY

BACKGROUND

The field of the disclosure relates generally to gas turbine engines and, more particularly, to a system for an inlet guide vane (IGV) shroud and baffle assembly.

Gas turbine engines typically include a high pressure compressor (HPC) including a rotor and a stator. An air-filled cavity is typically present between the rotor and the stator, including a space between a row of IGVs and the first stage of the rotor. If such a cavity is not effectively shrouded and baffled, excessive vibration and turbulence in the cavity can lead to diminished engine performance. Since at least some known gas turbine engines have strict requirements for shroud forward shape, addressing the negative effects on engine performance of large air-filled cavities is problematic.

BRIEF DESCRIPTION

In one aspect, a shroud and baffle assembly for a gas turbine engine is provided. The gas turbine engine includes a central axis, a fan assembly positioned at a forward end, and an exhaust outlet positioned at an aft end. The shroud and baffle assembly includes a shroud. The shroud includes a first end configured to couple to an annular support member of the gas turbine engine, and a second end. The shroud also includes a distal end including an axially aft extending lip, and a seal assembly configured to form a seal with an annular set of rotating teeth on a rotor of the gas turbine engine. The shroud further includes an arcuate shroud body extending between the distal end and the second end. The shroud extends circumferentially about the engine axis. The shroud and baffle assembly also includes a baffle coupled to an aft side of the shroud. The baffle includes a radially outward end coupled to the aft side, a radially inward end coupled to the axially aft extending lip, and an arcuate baffle body extending there between. The baffle extends circumferentially about the engine axis.

In another aspect, an inlet guide vane (IGV) assembly for a gas turbine engine is provided. The gas turbine engine includes a central axis, a fan assembly positioned at a forward end, and an exhaust outlet positioned at an aft end. The IGV assembly includes a shroud including a first end configured to couple to an annular support member of the gas turbine engine, a second end, and a distal end including an axially aft extending lip. The distal end further includes a seal assembly configured to form a seal with an annular set of rotating teeth on a rotor of the gas turbine engine. The shroud further includes an arcuate shroud body extending between the distal end and the second end, where the shroud extends circumferentially about the central axis. The IGV assembly also includes a baffle coupled to an aft side of the shroud. The baffle includes a radially outward end coupled to the aft side, a radially inward end coupled to the axially aft extending lip, and an arcuate baffle body extending there between, where the baffle extends circumferentially about the central axis. The IGV assembly further includes a plurality of IGVs, each IGV of the plurality of IGVs coupled to the radially outward surface, where the radially outward surface is configured to engage at least one IGV of the plurality of IGVs thereto, and where the plurality of IGVs are arranged radially about the central axis.

In yet another aspect, a gas turbine engine is provided. The gas turbine engine includes a central axis, a fan assembly positioned at a forward end, and an exhaust outlet positioned at an aft end. The gas turbine also includes a core engine including a compressor, a combustor, and a turbine coupled in a serial flow relationship. The gas turbine further includes a power engine including a fan and a power turbine coupled together on a common shaft, the power engine coaxial with the core engine. The gas turbine engine also includes a shroud and baffle assembly. The shroud and baffle assembly includes a shroud. The shroud includes a first end configured to couple to an annular support member of the gas turbine engine, and a second end. The shroud also includes a distal end including an axially aft extending lip, and a seal assembly configured to form a seal with an annular set of rotating teeth on a rotor of the gas turbine engine. The shroud further includes an arcuate shroud body extending between the distal end and the second end. The shroud and baffle assembly also includes a baffle coupled to an aft side of the shroud. The baffle includes a radially outward end coupled to the aft side, a radially inward end coupled to the axially aft extending lip, and an arcuate baffle body extending there between. The baffle extends aftward into an annular space of the gas turbine engine. The gas turbine engine further includes a plurality of inlet guide vanes (IGVs). Each IGV of the plurality of IGVs are coupled radially to and between the radially outward surface and a radially inward surface of an annular housing of the compressor. The shroud, the baffle, the plurality of IGVs, and the annular housing are arranged circumferentially about the central axis.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-14 show example embodiments of the apparatus and system described herein.

FIG. 1 is a schematic illustration of an exemplary gas turbine engine.

FIG. 2 is a schematic diagram of an exemplary high pressure compressor (HPC) which may be used in the gas turbine engine shown in FIG. 1.

FIG. 3 is a cross-sectional schematic diagram of an exemplary embodiment of a shroud and baffle assembly which may be used in the HPC shown in FIG. 2.

FIG. 4 is a cross-sectional schematic diagram of an exemplary forward shroud and fan hub frame that may be used in the shroud and baffle assembly shown in FIG. 3.

FIG. 7 is a perspective view of a sector section of an exemplary assembled forward shroud, shroud, and baffle that may be used in the shroud and baffle assembly shown in FIG. 3.

FIG. 8 is a perspective view of a sector section of an exemplary shroud and baffle assembly that may be used in the HPC shown in FIG. 2.

FIG. 9A is a forward-to-aft perspective view of a sector section of an exemplary shroud and baffle assembly with installed IGVs that may be used in the HPC shown in FIG. 2.

FIG. 9B is an aft-to-forward perspective view of a sector section of an exemplary shroud and baffle assembly with installed IGVs that may be used in the HPC shown in FIG. 2.

FIG. 10 is a cross-sectional schematic diagram of an exemplary embodiment of a shroud and baffle assembly with installed IGVs that may be used in the HPC shown in FIG. 2.

FIG. 11 is a forward-to-aft perspective and cross-sectional schematic diagram of an exemplary assembled forward shroud, shroud, and baffle with installed IGVs that may be used in the shroud and baffle assembly shown in FIG. 3.

FIG. 13 is an aft-to-forward perspective view of the exemplary shroud and baffle assembly with installed IGVs shown in FIG. 12A.

FIG. 14 is a side cut away view of a portion of the exemplary shroud and baffle assembly with installed IGVs shown in FIGS. 12A and 13, without installed baffle.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

The following detailed description illustrates embodiments of the disclosure by way of example and not by way of limitation. It is contemplated that the disclosure has general application to a method and system for inlet guide vane (IGV) shrouds and baffles.

Embodiments of the IGV shroud and baffle assembly described herein effectively reduce vibration and turbulence in air-filled cavities present in gas turbine engines between the rotor and the stator, including a space between a row of IGVs and the first stage of the HPC rotor. Improved performance of gas turbine engines is further accomplished by the IGV shroud and baffle assembly described herein by separating a greater amount of air in such cavities from the flow paths relative to known shroud and baffle assemblies. Also, such enhanced performance of gas turbine engines is accomplished by the IGV shroud and baffle assembly described herein while maintaining conformance to strict requirements for shroud forward shape.

Figure 1:
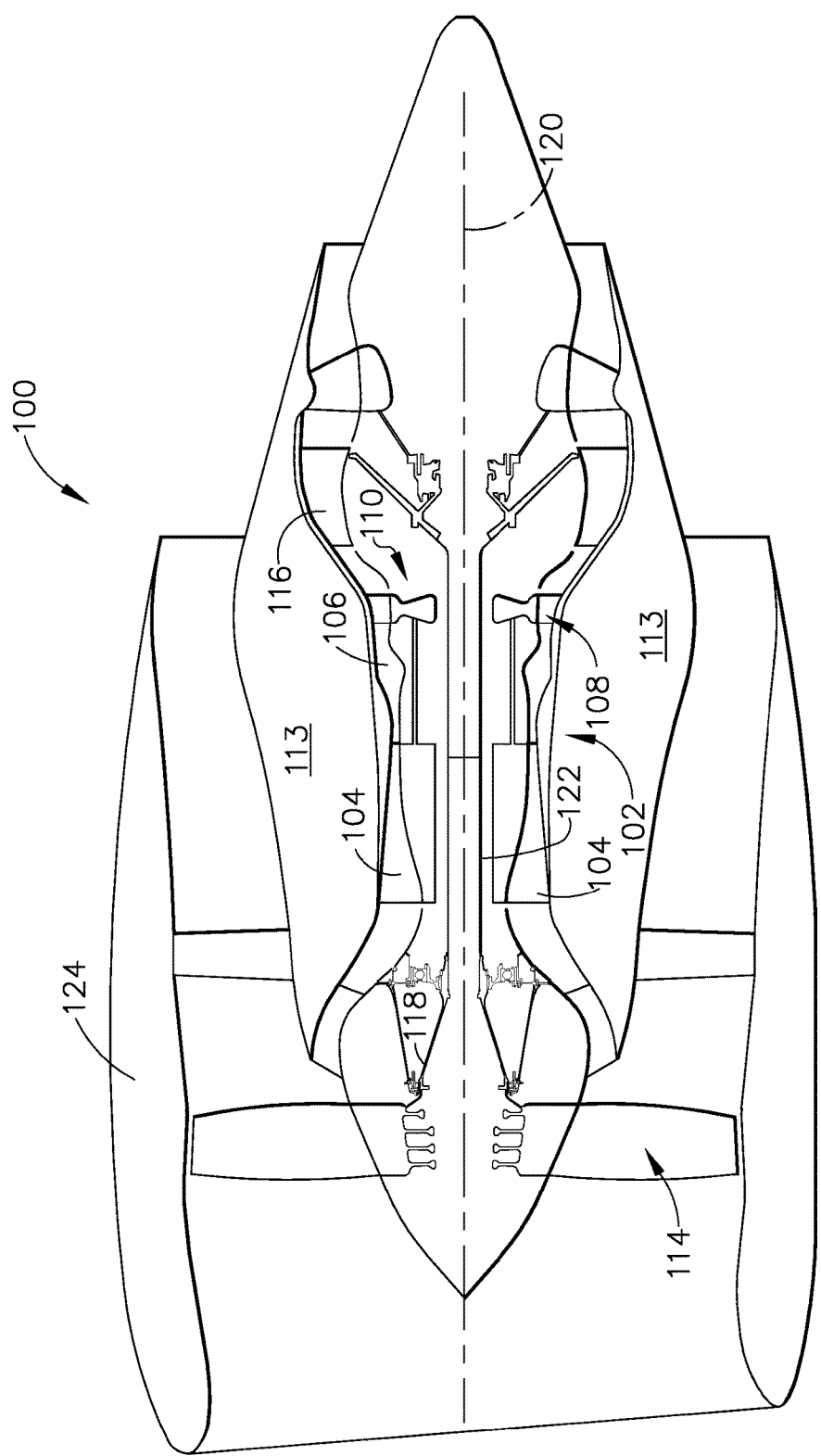

FIG. 1 is a schematic illustration of an exemplary gas turbine engine. Gas turbine engine 100 includes a gas generator or core engine 102 that includes a high pressure compressor (HPC) 104, a combustor assembly 106, and a high pressure turbine (HPT) 108 in an axial serial flow relationship on a core engine rotor 110 rotating about a core engine shaft 112. HPC 104, combustor assembly 106, HPT 108, core engine rotor 110, and core engine shaft 112 are located inside of an annular housing 113. Gas turbine engine 100 also includes a low pressure compressor or fan 114 and a low pressure turbine 116 arranged in an axial flow relationship on a power engine rotor 118.

In operation, in the exemplary gas turbine engine 100, air flows along a central axis 120, and compressed air is supplied to HPC 104. The highly compressed air is delivered to combustor assembly 106. Exhaust gas flows (not shown in FIG. 1) from combustor assembly 106 and drives turbines 108 and 116 to drive power engine shaft 122. Power engine shaft 122 drives power engine rotor 118 and low pressure compressor, i.e., fan, 114. Gas turbine engine 100 also includes a fan or low pressure compressor containment case 124.

Figure 2:
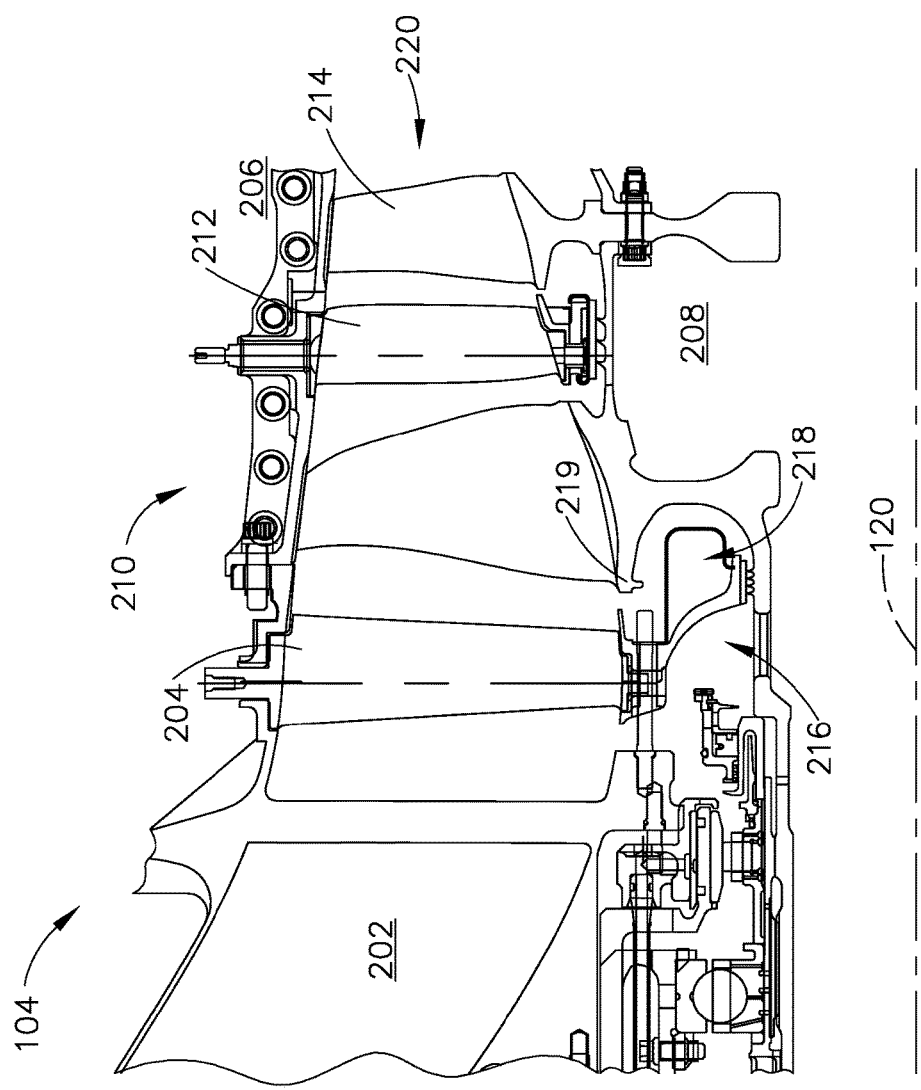

FIG. 2 is a schematic diagram of an exemplary HPC 104 which may be used in the gas turbine engine shown in FIG. 1. HPC 104 includes an inlet 202. Inlet 202 is the start of the main flow path of air into HPC 104. IGV 204 directs air flow further into inlet 202 of HPC 104 at a defined angle while also providing control of mass flow through the turbine. HPC 104 also includes a non-rotating stator 206 and a rotating rotor 208. Stator 206 includes a stator blade carrier 210 to which a plurality of stator blades 212 are coupled. Rotor 208 includes a plurality of rotor blades 214 coupled thereto. HPC 104 further includes a shroud 216. Shroud 216 is coupled to an end of IGV 204 proximate an end of rotor 208 proximate inlet 202. The proximity of shroud 216 to rotor 208 forms an annular space of gas turbine engine 100, including, without limitation, an annular, i.e., circumferential, air-filled cavity 218, there between. In alternative embodiments of HPC 104 (not shown in FIG. 2), shroud 216 further includes a baffle coupled to shroud 216 and which extends further into air-filled cavity 218. Air-filled cavity 218 defines an annular space bordered by shroud 216 and a rotor nose 219 of rotor 208. IGVs 204 are coupled to radially outward surfaces relative to central axis 120. Shroud 216 extends as one piece circumferentially about central axis 120 to thereby fill at least a portion of air-filled cavity 218. In other alternative embodiments, not shown, shroud 216 is formed not as one annular piece, but rather as a plurality of sectors of a circumferential assembly of shroud 216 sectors.

In operation, in the exemplary HPC, as air in the main flow path from inlet 202 enters HPC 104, air in the main flow path is accelerated toward an outlet 220 by rotor blades 214 and stator blades 212. Combined with the constriction in diameter of the main flow path, the effect is to eject highly compressed air through outlet 220 toward combustor assembly 106 at a high velocity. Shroud 216 mitigates undesirable effects on HPC 104 resulting from vibration and turbulence in the main flow path by filling at least a portion of air-filled cavity 218.

Figure 3:
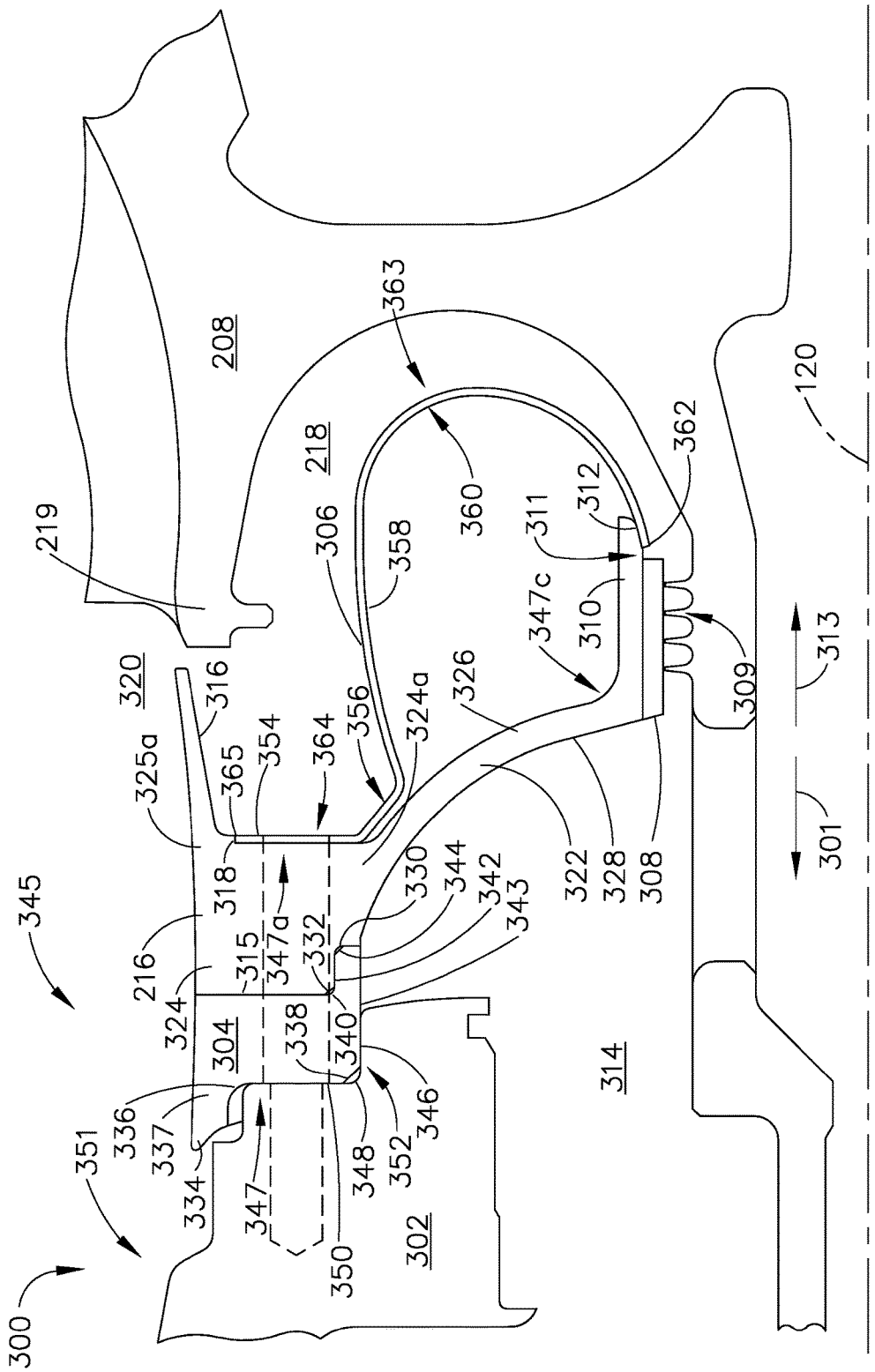

FIG. 3 is a cross-sectional schematic diagram of an exemplary embodiment of a shroud and baffle assembly which may be used in the HPC shown in FIG. 2. In the exemplary embodiment, shroud and baffle assembly 300 is positioned proximate a forward end 301 of rotor 208. Shroud and baffle assembly 300 includes an annular support member, including, without limitation, a fan hub frame 302, a forward shroud 304, shroud 216, and a baffle 306. Each of fan hub frame 302, forward shroud 304, shroud 216, and baffle 306 extend as one piece circumferentially about central axis 120 to thereby fill at least a portion of air-filled cavity 218. In other alternative embodiments, not shown, at least one of fan hub frame 302, forward shroud 304, shroud 216, and baffle 306 is not formed as a single annular piece, but rather as a plurality of sectors of a circumferential, i.e., annular, assembly.

Also, in the exemplary embodiment, shroud 216 includes a seal assembly, including, without limitation, a rub coating 308 on a distal end, including, without limitation, a flat portion 310, of shroud 216. Rub coating 308 is formed on a radially inward surface of flat portion 310. Rub coating 308 is configured to form a seal with an annular set of rotating teeth 309 on rotor 208. Flat portion 310 protrudes to the aft of HPC 104 (shown in FIGS. 1 and 2, but not shown in FIG. 3). Flat portion 310 also includes an axially aft extending lip 311, including, without limitation, a shroud bevel 312, on radially inward surface of flat portion 310 facing toward an aft end 313 of shroud and baffle assembly 300. In an alternative embodiment, not shown, shroud bevel 312 is not present on flat portion 310. Rub coating 308 is formed from a material including, without limitation, TEFLON A16B95, which facilitates a seal between air-filled cavity 218 aft of shroud and baffle assembly 300 and a forward cavity 314.

Further, in the exemplary embodiment, shroud 216 of shroud and baffle assembly 300 includes a forward shroud face 315. Shroud 216 also includes an overhang, including, without limitation, a tapered overhang 316 angled radially outward and to the aft of an aft lip 318. Tapered overhang 316 facilitates separation of air-filled cavity 218 from an aft cavity 320 to the aft of IGVs (not shown in FIG. 3). Shroud 216 further includes an arcuate radially inwardly extending body, including, without limitation, a rounded leg 322, coupled to and between flat portion 310 and a shroud block 324. Shroud block also includes a radially inward aft corner 324a, and a radially outward aft corner 325a from which tapered overhang 316 extends axially aftward. Rounded leg 322 includes a convex side 326 facing to the aft toward air-filled cavity 218. Rounded leg 322 also includes a concave side 328 facing forward toward forward cavity 314. Convex side 326 of rounded leg 322 is coupled to shroud block 324 at the aft edge of shroud block 324. A concave side 328 of rounded leg 322 is coupled to shroud block 324 at a forward lip 330 on the underside of shroud block 324. Shroud block 324 also includes a forward shaped edge 332 on the radially inward surface of shroud block 324 facing shroud 216. Further, in the exemplary embodiment, shroud block 324, tapered overhang 316, rounded leg 322, and flat portion 310 are unitarily formed in shroud 216 from the same material of construction, including, without limitation, AL2618.

Furthermore, in the exemplary embodiment, forward shroud 304 of shroud and baffle assembly 300 includes a curved overhang 334 angled radially outward and to the aft of a curved forward lip 336 proximate a forward top corner 337. Forward shroud 304 also includes a forward bevel 338 on the radially inward surface of forward shroud 304 facing fan hub frame 302. Moreover, in the exemplary embodiment, forward shroud 304 includes an angled portion 340 which nests with forward shaped edge 332 of shroud block 324 to facilitate coupling of forward shroud 304 to shroud 216. Forward shroud 304 further includes a flat extension 342 protruding to the aft of forward shroud 304 from angled portion 340. A flat bottom surface 343 lies between flat extension 342 and forward bevel 338. Flat extension 342 includes an aft bevel 344 which nests with forward lip 330 of shroud block 324 to facilitate coupling of forward shroud 304 to shroud 216. Also, in the exemplary embodiment, curved overhang 334 and flat extension 342 are continuously formed into forward shroud 304 from the same material of construction, including, without limitation, AL2618. Together, forward shroud 304 and shroud 216 constitute a middle section 345 of shroud and baffle assembly 300.

Moreover, in the exemplary embodiment, fan hub frame 302 of shroud and baffle assembly 300 includes a flat base 346 upon which rests forward shroud 304. Also, in the exemplary embodiment, fan hub frame 302 includes a concave bevel 348 between flat base 346 and a vertical receiver 350, i.e., a forward shroud aft face. Together, flat base 346, concave bevel 348, and vertical receiver 350 facilitate nesting coupling of fan hub frame 302 to forward shroud 304 in a rabbet contact 352 configuration. Further, in the exemplary embodiment, flat base 346 and vertical receiver 350, along with all other portions of fan hub frame 302 (described below with reference to FIG. 4) are unitarily formed in fan hub frame 302 from the same material of construction, including, without limitation, TI 6-4 F. Also, in the exemplary embodiment, middle section 345 of shroud and baffle assembly 300 includes a forward end 347, an aft side 347a, and a distal end, i.e., flat portion 310. Flat portion 310 extends from a radially inward end 347c of rounded leg 322.

Also, in the exemplary embodiment, baffle 306 includes a first end, including, without limitation, a vertical forward portion 354 and an angled intersection 356. Baffle 306 also includes an arcuate body, including, without limitation, a curved top portion 358 and a curved aft portion 360. Baffle 306 further includes a second end 362. Vertical forward portion 354, angled intersection 356, curved top portion 358, curved aft portion 360, and second end 362 are continuously formed into baffle 306 from the same material of construction, including, without limitation, IN625. Curved aft portion 360 defines a convex arc facing to the aft, with an aft surface thereof in contact with air-filled cavity 218. Likewise, curved top portion 358 defines a convex arc facing radially outward, i.e., away from central axis 120 of gas turbine engine 100 (shown in FIG. 1), with a radially outwardly facing outer surface also in contact with air-filled cavity 218. Vertical forward portion 354, angled intersection 356, and second end 362 together facilitate nesting coupling of baffle 306 to shroud 216. A tip 365 of baffle 306 nests into the underside, i.e., toward central axis 120 of gas turbine engine 100, aft lip 318 of shroud 216. Angled intersection 356 nests onto the aft surface of angled portion 340 of shroud 216 along the portion of angled portion 340 proximate shroud block 324. Second end 362 contacts the radially inward surface of flat portion 310 of shroud 216, but does not contact the aft boundary of rub coating 308. Baffle 306 constitutes an aft section 363 of shroud and baffle assembly 300.

Further, in the exemplary embodiment, at least one bore 364 facilitates coupling of baffle 306, shroud 216, forward shroud 304, and fan hub frame 302. Bore 364 extends axially, i.e., parallel to central axis 120 of gas turbine engine 100, completely through vertical forward portion 354 of baffle 306. Bore 364 also extends axially completely through shroud block 324 of shroud 216. Further, in the exemplary embodiment, bore 364 also extends axially completely through forward shroud 304. Furthermore, bore 364 extends axially only partially, but not entirely through fan hub frame 302. A fastener (shown in FIGS. 7, 9, 10, 12, and 14) is first inserted into bore 364 of baffle 306. The fastener continues through bore 364 of shroud 216, forward shroud 304, and fan hub frame 302, in that order. Fan hub frame 302 constitutes a forward section 351 of shroud and baffle assembly 300.

In operation, in the exemplary embodiment, forward-facing surfaces of forward shroud 304 facilitate coupling of forward shroud 304 to complimentary shapes on aft-facings surfaces of fan hub frame 302 in a rabbet contact 352 configuration. Likewise, in operation of the exemplary embodiment, aft-facing surfaces of forward shroud 304 facilitate coupling of forward shroud 304 to complimentary shapes on forward-facing surfaces of shroud 216. Coupling of aft-facing surfaces of forward shroud 304 to forward-facing surfaces of shroud 216 is further described below with reference to FIGS. 6, 7, and 10.

Figure 4:
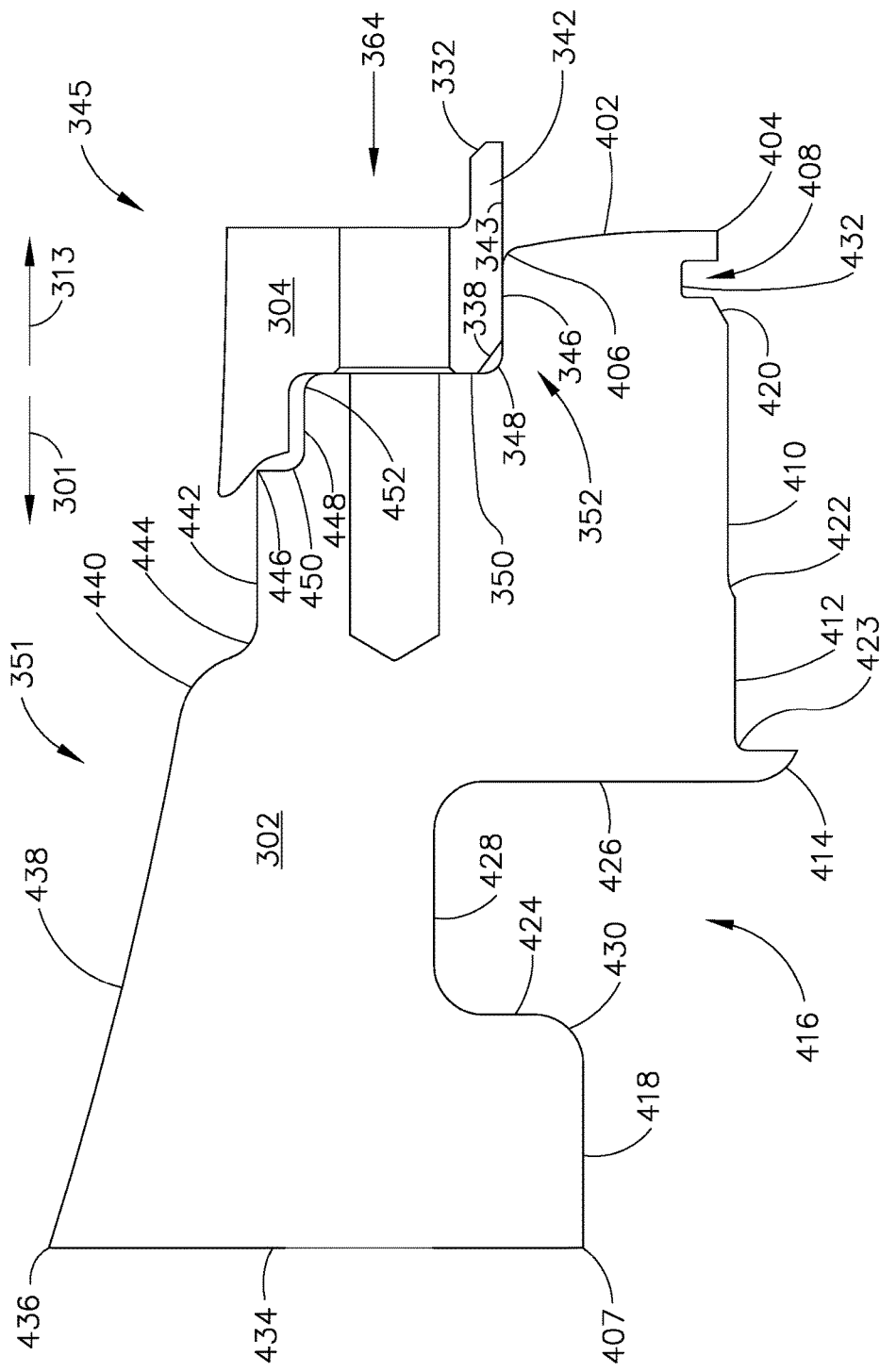

FIG. 4 is a cross-sectional schematic diagram of an exemplary forward shroud and fan hub frame that may be used in the shroud and baffle assembly shown in FIG. 3. Forward shroud 304 is as shown and described above with reference to FIG. 3. In addition to flat base 346, concave bevel 348, and vertical receiver 350, fan hub frame 302 also includes an aft facing curved face 402 extending radially outward from a bottom aft corner 404 to meet flat base 346 at a curved bottom aft rabbet corner 406. Extending axially from bottom aft corner 404 to a bottom forward corner 407 is a square notch 408, a first flat bottom 410, a second flat bottom 412, a downward peg 414, and a wide notch 416, and a third flat bottom 418. First flat bottom 410 meets the aft corner of square notch 408 at a square notch bevel 420. First flat bottom 410 defines a flat surface a finite distance radially outward from second flat bottom 412. First flat bottom 410 meets second flat bottom 412 at a first bottom curved bevel 422. Downward peg 414 extends radially inward by a finite distance beyond, i.e., radially inward from, the surface defined by second flat bottom 412. Downward peg 414 meets second flat bottom 412 at a second bottom curved bevel 423. Wide notch 416 includes a forward face 424, an aft face 426, and a top face 428. Aft face 426 extends radially outward from downward peg 414 to meet top face 428, and forward face 424 extends radially inward from top face 428 to meet third flat bottom 418 at a round corner 430. Third flat bottom 418 is a finite distance radially inward from top face 428 and a finite distance radially outward from a top 432 of square notch 408.

Also, in the exemplary embodiment, fan hub frame 302 further includes a forward flat front 434 extending radially outward from a bottom forward corner 407 to a top forward corner 436. Forward flat front represents a section line separating aft portions of fan hub frame 302 from forward portions of the same that are not pertinent to this disclosure, i.e., since those portions are part of the larger fan hub frame structural part which do not couple to forward shroud 304 to the aft of fan hub frame 302. Fan hub frame 302 also includes a topmost face 438 defining a gradual concave surface facing radially outward and extending from top forward corner 436 to a convex top corner 440. Convex top corner 440 is located directly radially outward from second flat bottom 412. Convex top corner 440 meets a first flat top 442 at a concave top corner 444. First flat top 442 extends axially from concave top corner 444 to the aft of fan hub frame 302 to a top aft corner 446. A second flat top 448 defines an axially flat surface which lies a finite distance radially inward from first flat top 442. A second flat top 448 meets first flat top 442 at its forward end at a top aft concave bevel 450, and second flat top 448 meets vertical receiver 350 at its aft at a top aft convex bevel 452.

In operation, in the exemplary embodiment, fan hub frame 302 couples the forward-facing surfaces of forward shroud 304 to the aft-facing surfaces of fan hub frame 302. The aft-facing surfaces of fan hub frame 302 include first flat top 442, top aft corner 446, top aft concave bevel 450, second flat top 448, top aft convex bevel 452, vertical receiver 350, concave bevel 348, flat base 346, and curved bottom aft rabbet corner 406 of fan hub frame 302. Together, aft-facing surfaces of fan hub frame 302 facilitate nesting coupling of fan hub frame 302 to forward-facing surfaces of forward shroud 304 in a rabbet contact 352 configuration.

Figure 5A:
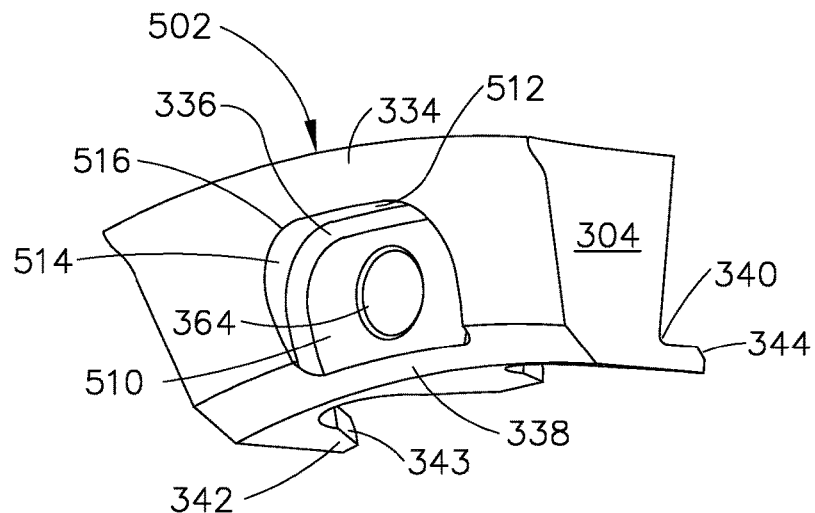
FIG. 5A is a forward-to-aft perspective view of a sector section of an exemplary forward shroud that may be used in the shroud and baffle assembly shown in FIG. 3.
Figure 5B:
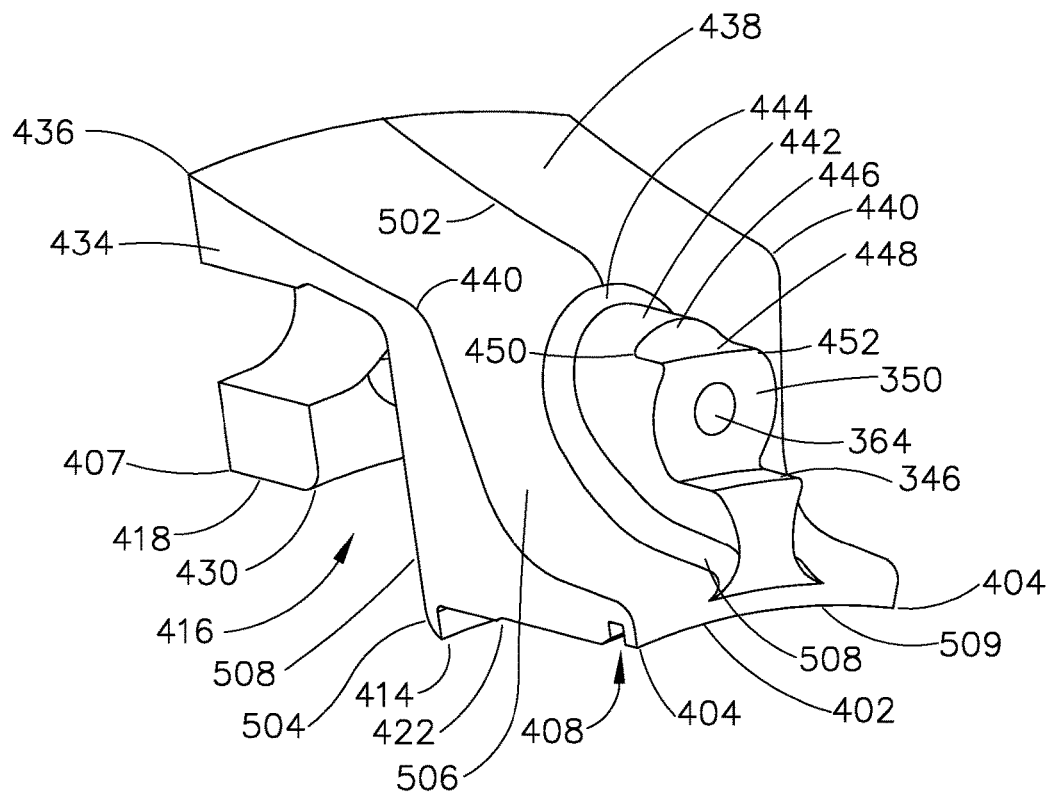
FIG. 5B is an aft-to-forward perspective view of a sector section of an exemplary fan hub frame that may be used in the shroud and baffle assembly shown in FIG. 3.

FIG. 5A is a forward-to-aft perspective view of a sector section of an exemplary forward shroud that may be used in the shroud and baffle assembly shown in FIG. 3. FIG. 5B is an aft-to-forward perspective view of a sector section of an exemplary fan hub frame that may be used in the shroud and baffle assembly shown in FIG. 3. Forward shroud 304 is as shown and described above with reference to FIGS. 3 and 4. In the exemplary embodiment, topmost face 438 of fan hub frame 302 curves radially inward and circumferentially to the left and right of a centerline 502. Also in the exemplary embodiment, and as shown and described above with reference to FIG. 4, topmost face 438 curves gradually radially outwardly from convex top corner 440 to top forward corner 436. Fan hub frame 302 also includes a nub 504. Nub 504 includes first flat top 442, top aft corner 446, top aft concave bevel 450, second flat top 448, top aft convex bevel 452, bore 364, vertical receiver 350, concave bevel 348, rabbet contact 352, and flat base 346, all of which are shown and described above with reference to FIG. 4. Further, in the exemplary embodiment, first flat top 442 of nub 504 curves radially inward and laterally to the left and right of centerline 502, meeting an aft facing concave face 506 at a nub bevel 508. Furthermore, in the exemplary embodiment, a bottom aft edge 509 is concavely curved circumferentially about central axis 120, not shown. Likewise, the radially inward edge defined by downward peg 414 curves circumferentially about central axis 120. Similarly, the radially inward surface of fan hub frame 302 defined by the laterally left and right radially inward forward corners 407 and round corners 430 curve circumferentially about central axis 120. Thus, in the exemplary embodiment, the aforementioned two radially inward surfaces, along with the radially inward surface defined by top face 428 of wide notch 416, are also curved circumferentially about central axis 120. Additional numbered features of forward shroud 304 and fan hub frame 302 are shown in FIGS. 5A and 5B to facilitate cross-referencing FIGS. 5A and 5B with FIGS. 3 and 4.

Also, in the exemplary embodiment, the forward portion of forward shroud 304 includes a recessed flat surface 510. Forward bevel 338 defines the radially inward surface of recessed flat surface 510 and also defines where recessed flat surface meets the radially inward surface of forward shroud 304 which extends to the aft into flat extension 342 of forward shroud 304. Further, in the exemplary embodiment, forward bevel 338 extends in a U-shaped direction toward forward shroud 304. Recessed flat surface 510 is abutted to its radially outward side, and arcuately to the left and the right by a recessed roof 512 and two recessed walls 514, respectively. Recessed walls 514 meet recessed roof 512 on the left and the right at two curved intersections 516. Bore 364 passes through forward shroud 304 at approximately the center of recessed flat surface 510. Additional numbered features of forward shroud 304 and fan hub frame 302 are shown in FIGS. 5A and 5B to facilitate cross-referencing FIGS. 5A and 5B with FIGS. 3 and 4.

In operation, in the exemplary embodiment, forward-facing surfaces of forward shroud 304 facilitate coupling of forward shroud 304 to complimentary shapes on aft-facings surfaces of fan hub frame 302 in a rabbet contact 352 configuration, as shown and described above with reference to FIGS. 3 and 4. More specifically, in the exemplary embodiment, rabbet contact 352 configuration (shown and described above with reference to FIGS. 3 and 4) between forward shroud 304 and fan hub frame 302 is made between forward-facing surfaces of recessed flat surface 510 and aft-facing surfaces of vertical receiver 350, respectively. Also, in the exemplary embodiment, rabbet contact 352 configuration between forward shroud 304 and fan hub frame 302 is made between radially inward-facing surfaces of recessed roof 512 and radially outward-facing surfaces of second flat top 448, respectively. Further, rabbet contact 352 configuration between forward shroud 304 and fan hub frame 302 is made between radially inward-facing surfaces of flat bottom surface 343 and radially outward-facing surfaces of flat base 346, respectively. Together, surfaces of fan hub frame 302 facilitate nesting coupling of fan hub frame 302 to surfaces of forward shroud 304 in rabbet contact 352 configuration.

Also, in operation of the exemplary embodiment, the three aforementioned circumferentially curved radially inward surfaces of fan hub frame 302 facilitate installation of shroud and baffle assembly 300 in HPC 104 about its central axis 120, as shown and described further below with reference to FIGS. 12-14.

Figure 6A:
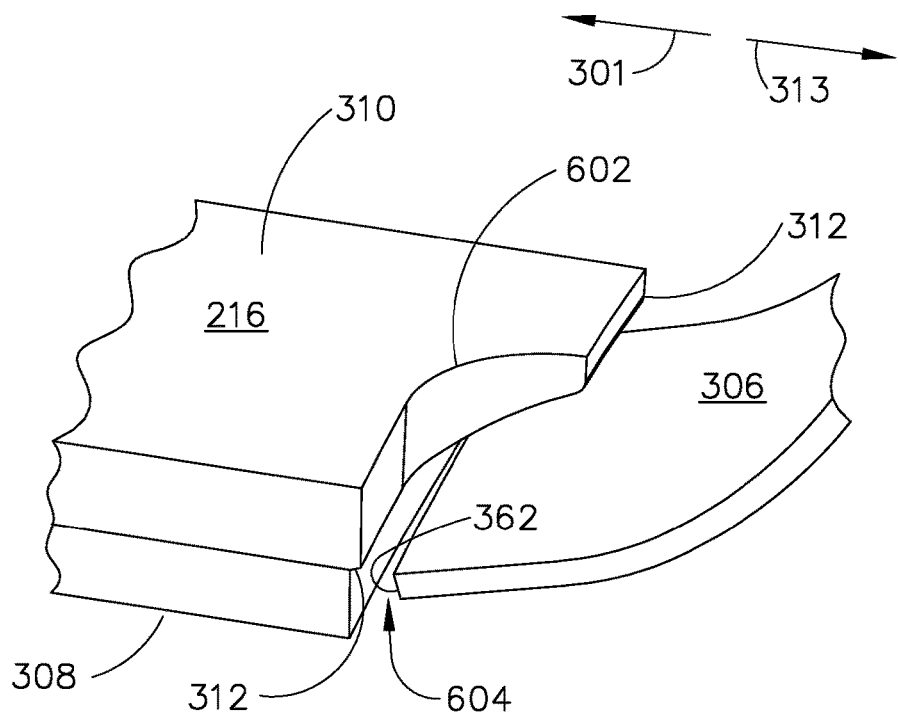
FIG. 6A is an aft-to-forward perspective view of a sector section of portions of the exemplary shroud and baffle of the assembly shown in FIG. 3.
Figure 6B:
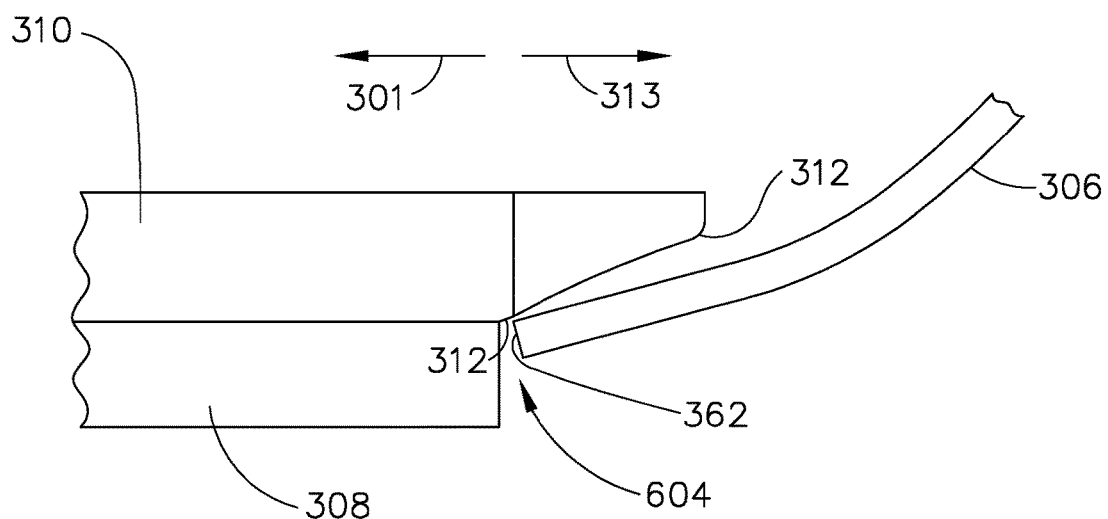
FIG. 6B is a cross-sectional schematic diagram of portions of the exemplary shroud and baffle of the assembly shown in FIG. 3.

FIG. 6A is an aft-to-forward perspective view of a sector section of portions of the exemplary shroud and baffle of the assembly shown in FIG. 3. FIG. 6B is a cross-sectional schematic diagram of portions of the exemplary shroud and baffle of the assembly shown in FIG. 3. Shroud 216 and baffle 306 are each as shown and described above with reference to FIGS. 2 and 3. In the exemplary embodiment, a sector of shroud 216 includes s scallop 602 at its aft-most edge which defines a U-shaped cut away into flat portion 310. Shroud bevel 312 is continuously along the bottom aft edge of shroud 216, including through scallop 602. Also, in the exemplary embodiment, a gap 604 is present between shroud bevel 312 of shroud 216 and second end 362 of baffle 306. As such, the radially outward surface of baffle 306 proximate second end 362 makes contact with radially inward facing surfaces of shroud bevel 312, but not including at gap 604. Further, in the exemplary embodiment, rub coating 308 on the radially inward surface of flat portion 310 of shroud 216 does not extend in the aft direction beyond the forward boundary of shroud bevel 312. Furthermore, in the exemplary embodiment, second end 362 is prevented from protruding in the forward direction beyond the aft boundary of shroud bevel 312. Additional numbered features of shroud 216 and baffle 306 are shown in FIGS. 6A and 6B to facilitate cross-referencing FIGS. 6A and 6B with FIGS. 2 and 3.

In operation, in the exemplary embodiment, baffle 306 includes, without limitation, arcuate baffles 306 which are compliant to flex alternately in the forward and aft directions in shroud and baffle assembly 300. As such, it is possible that a pressure exerted in the forward direction upon the aft surface of baffle 306 causes movement of baffle 306 in the forward direction. Likewise, it is possible that a pressure exerted in the aft direction on the forward surface of baffle 306 causes movement of baffle 306 in the aft direction. Thus, in operation of the exemplary embodiment, gap 604, scallop 602, and shroud bevel 312 together facilitate equalizing pressure on the either side of baffle 306, and prevent undesirable contact of second end 362 with rub coating 308.

Figure 7:
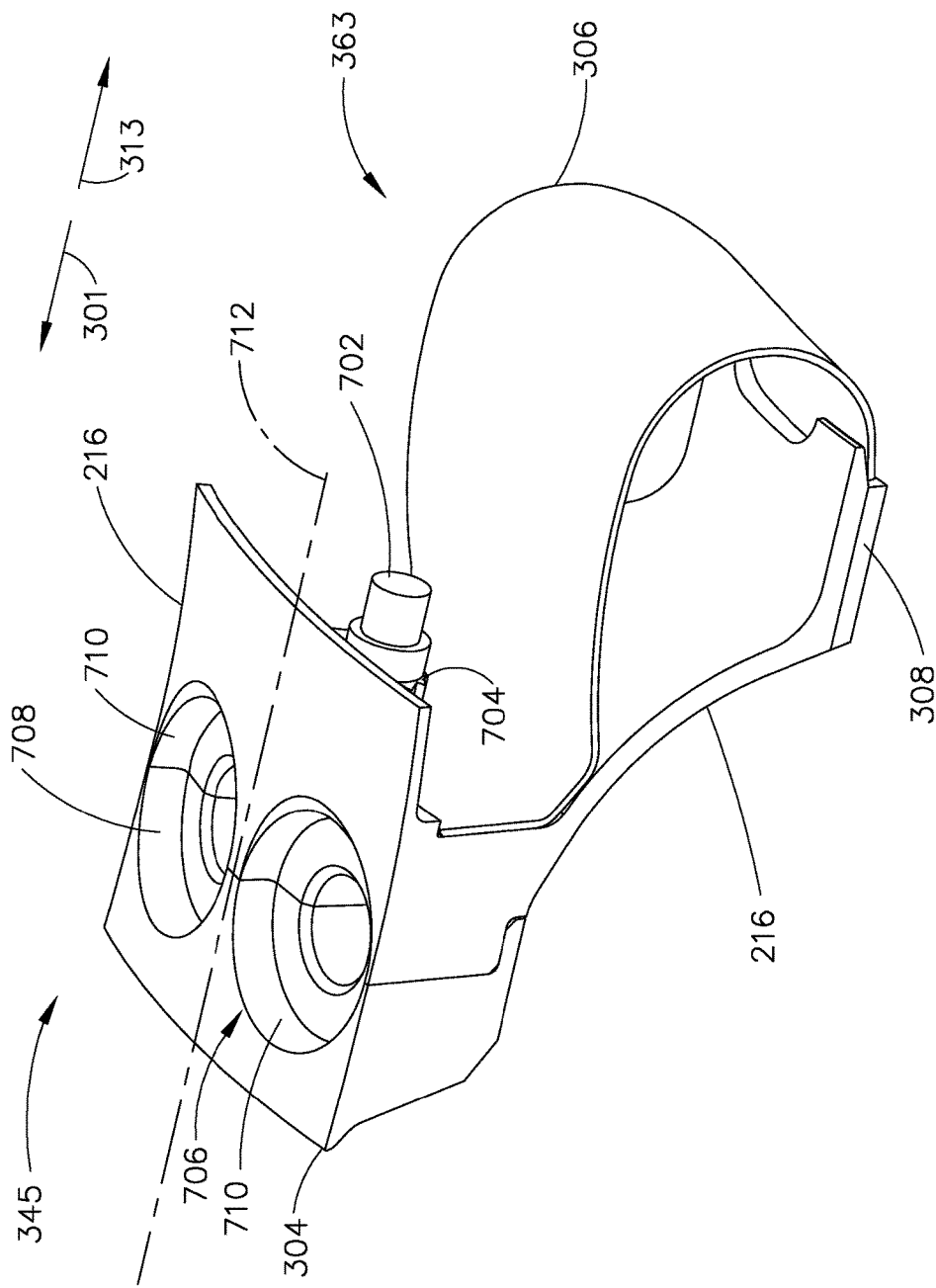

FIG. 7 is a perspective view of a sector section of an exemplary assembled forward shroud, shroud, and baffle that may be used in the shroud and baffle assembly shown in FIG. 3. Forward shroud 304, shroud 216 and baffle 306 are each as shown and described above with reference to FIGS. 2-6. In the exemplary embodiment, forward shroud 304, shroud 216, and baffle 306 are coupled together with at least one fastener 702. Also, in the exemplary embodiment, a nut 704 is included on fastener 702 to facilitate coupling together of forward shroud 304, shroud 216, and baffle 306. Further, in the exemplary embodiment, a left IGV slot 706 and a right IGV slot 708 enter into the radially outward surfaces of forward shroud 304 and shroud 216, but do not extend all the way through to the radially inward surfaces thereof. In alternative embodiments, not shown, left IGV slot 706 and right IGV slot 708 enter into radially outward surfaces of forward shroud 304 and shroud 216, and do extend all the way through to the radially inward surfaces thereof. Left and right IGV slots (706, 708) each further include a cylindrical recess 710. Each cylindrical recess 710 extends radially inward from radially outward surfaces of forward shroud 304 and shroud 216 by some fraction of the depth with which left IGV slot 706 and a right IGV slot 708 extend radially inward. Left IGV slot 706, right IGV slot 708, and cylindrical recesses 710 are formed laterally to the left and right of a center 712 of radially outward surfaces of forward shroud 304 and shroud 216. In some alternative embodiments, not shown, cylindrical recesses 710 are not present.

In operation, in the exemplary embodiment, and as further shown and described below with reference to FIGS. 9-13, radially inward ends of IGVs are inserted and secured into left IGV slot 706 and right IGV slot 708. Also, in operation of the exemplary embodiment, fastener 702 is inserted from the aft to the forward direction into bore 364 (not shown in FIG. 7) though baffle 306, shroud 216, forward shroud 304, and partly into fan hub frame 302 (also not shown in FIG. 7). Further, in operation of the exemplary embodiment, it is possible to facilitate coupling and securing of baffle 306, shroud 216, forward shroud 304, and fan hub frame 302 with nut 704.

Figure 8:
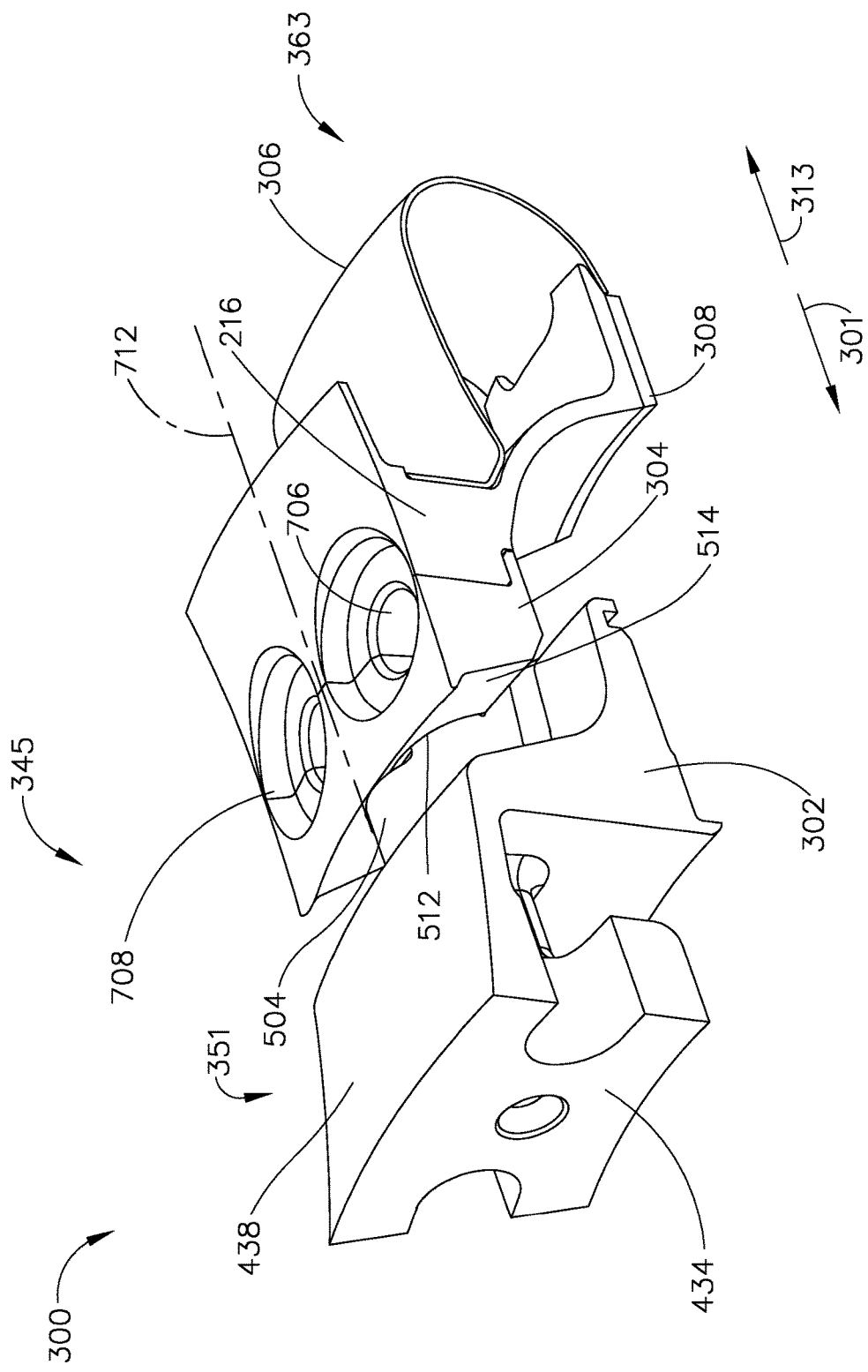
Figure 9:
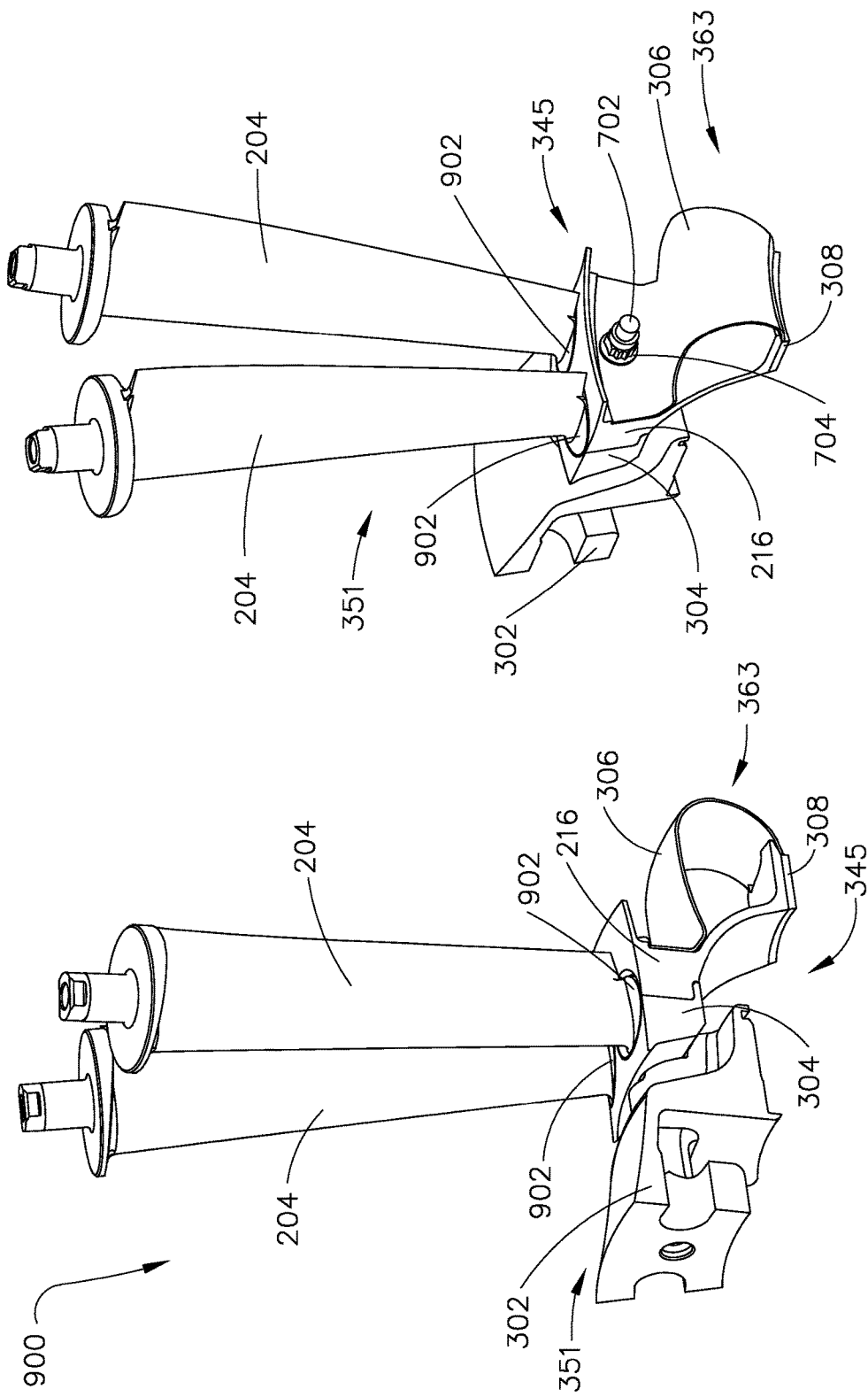

FIG. 8 is a perspective view of a sector section of an exemplary shroud and baffle assembly that may be used in the HPC shown in FIG. 2. Fan hub frame 302, forward shroud 304, shroud 216 and baffle 306 are each as shown and described above with reference to FIGS. 2-7. In the exemplary embodiment, surfaces of forward shroud 304, including, without limitation, surfaces of recessed roof 512 and recessed walls 514, are coupled to surfaces on nub 504 of fan hub frame 302. Also, in the exemplary embodiment, left IGV slot 706 and right IGV slot 708 are formed laterally to the left and right of a center 712 of radially outward surfaces of forward shroud 304 and shroud 216. In some alternative embodiments, not shown, forward shroud 304 and shroud 216 are not separately formed and coupled together by way of fastener. Rather, in some alternative embodiments, not shown, forward shroud 304 and shroud 216 are continuously formed as a single piece. In such alternative embodiments where forward shroud 304 and shroud 216 are formed as a single piece, left IGV 706 and right IGV 708 are similarly formed in the radially outward surface of shroud and baffle assembly 300 as described above for the exemplary embodiment. Operation of the exemplary embodiment is as described above with reference to FIG. 7. Additional numbered features of shroud and baffle assembly 300 are shown in FIG. 5 to facilitate cross-referencing FIG. 8 with prior figures.

FIG. 9A is a forward-to-aft perspective view of a sector of an exemplary shroud and baffle assembly with installed IGVs that may be used in the HPC shown in FIG. 2. FIG. 9B is an aft-to-forward perspective view of a sector of an exemplary shroud and baffle assembly with installed IGVs that may be used in the HPC shown in FIG. 2. Fan hub frame 302, forward shroud 304, shroud 216 and baffle 306 are each as shown and described above with reference to FIGS. 2-7. In the exemplary embodiment, shroud and baffle assembly with installed IGVs 900 includes two IGVs 204 per sector of shroud and baffle assembly with installed IGVs 900, each of which includes a base 902. Two IGVs 204 extend upward from left and right IGV slots (706,708) on radially outward surfaces of forward shroud 304 and shroud 216. The radially inward surface of each base 902 of each IGV 204 makes contact with radially outward surfaces of forward 304 and shroud 216, including, without limitation, at the radially outward surface of each cylindrical recess 710 (not shown in FIGS. 9A and 9B).

In operation, in the exemplary embodiment, each of the two IGVs 204 are coupled to and between mounting parts on radially inward surfaces proximate annular housing 113 of gas turbine engine 100 (not shown in FIG. 9A) and radially outward surfaces of forward shroud 304 and shroud 216 at a predetermined angle there between (as further shown and described below with reference to FIG. 12B).

Figure 10:
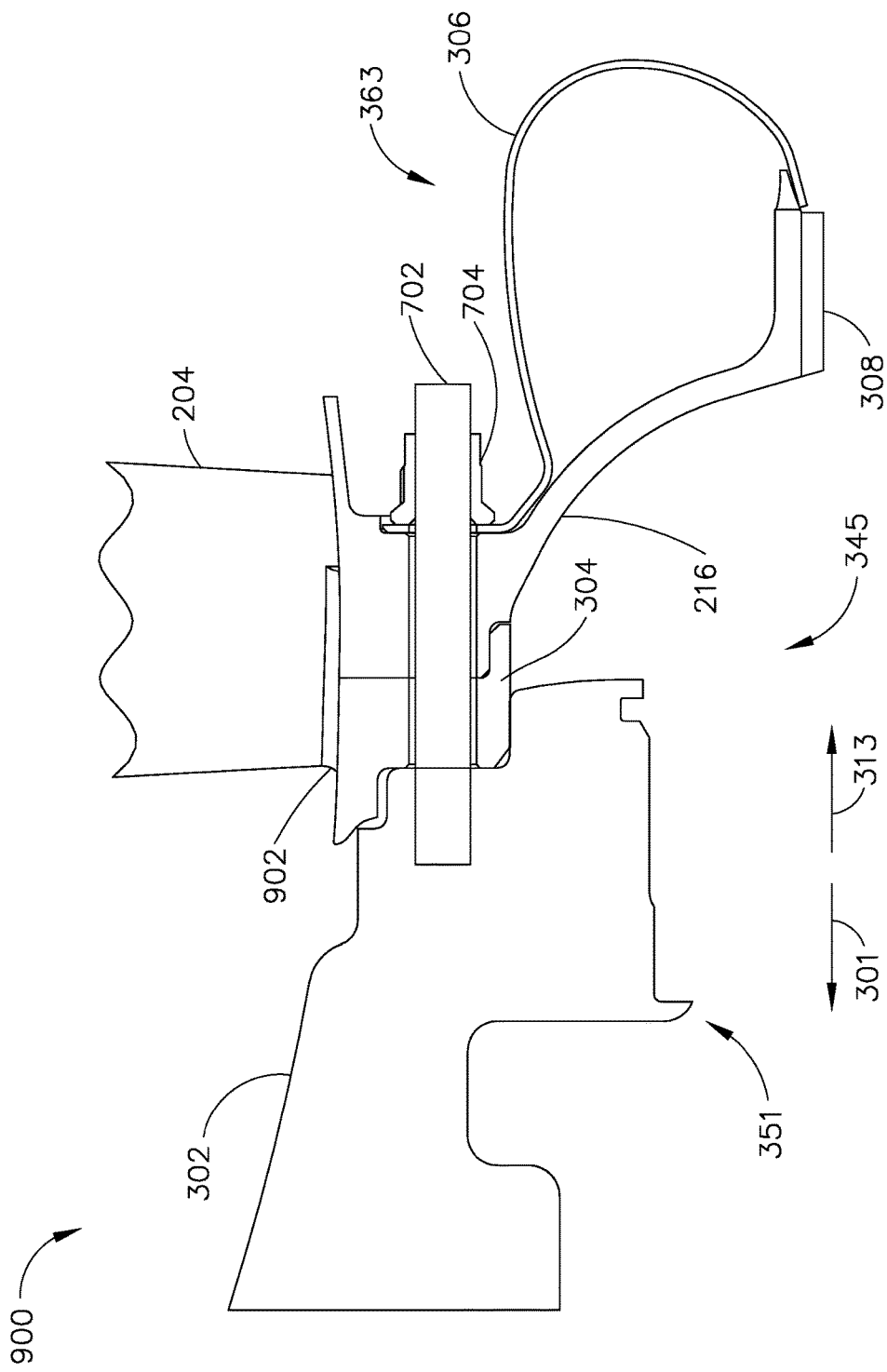

FIG. 10 is a cross-sectional schematic diagram of an exemplary embodiment of a shroud and baffle assembly with installed IGVs that may be used in the HPC shown in FIG. 2. Fan hub frame 302, forward shroud 304, shroud 216 and baffle 306 are each as shown and described above with reference to FIGS. 2-7. In the exemplary embodiment, fastener 702 and nut 704 facilitate coupling together of baffle 306, shroud 216, forward shroud 304, and fan hub frame 302. Operation of the exemplary embodiment is as described with reference to the foregoing figures.

Figure 11:
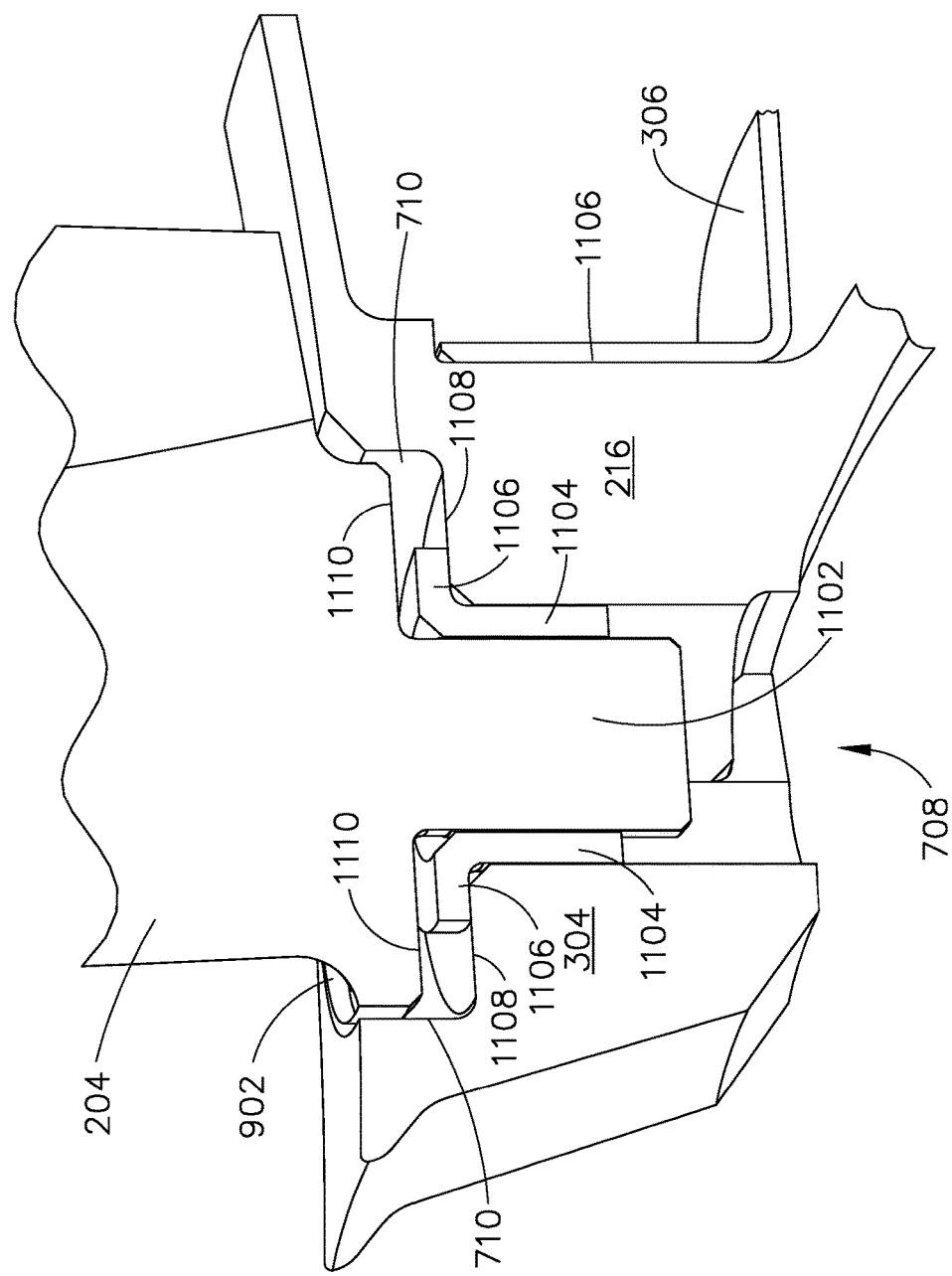

FIG. 11 is a forward-to-aft perspective view and cross-sectional schematic diagram of an exemplary assembled forward shroud, shroud, and baffle with installed IGVs that may be used in the shroud and baffle assembly shown in FIG. 3. Fan hub frame 302, forward shroud 304, shroud 216 and baffle 306 are each as shown and described above with reference to FIGS. 2-7. In the exemplary embodiment, IGV 204 includes an IGV base peg 1102 extending radially inward from the radially inward side of base 902 into right IGV slot 708. Also, in the exemplary embodiment, a bushing 1104 is first placed into right IGV slot 708 prior to insertion of IGV 204 therein. Further, in the exemplary embodiment, bushing 1104 includes a bushing lip 1106 which extends onto a floor 1108 of cylindrical recess 710. Bushing lip 1106 prevents a base bottom 1110 from contacting floor 1108 directly. In an alternative embodiment, not shown, bushing 1104 does not include bushing lip 1106 and it is possible for base bottom 1110 to contact floor 1108 directly. Furthermore, in the exemplary embodiment, the details of structures described above with reference to FIG. 11 apply equivalently to IGV base peg 1102 extending downward from IGV 204 into left IGV slot 706 (not shown in FIG. 11) of shroud and baffle assembly with installed IGVs 900.

Figure 12A:
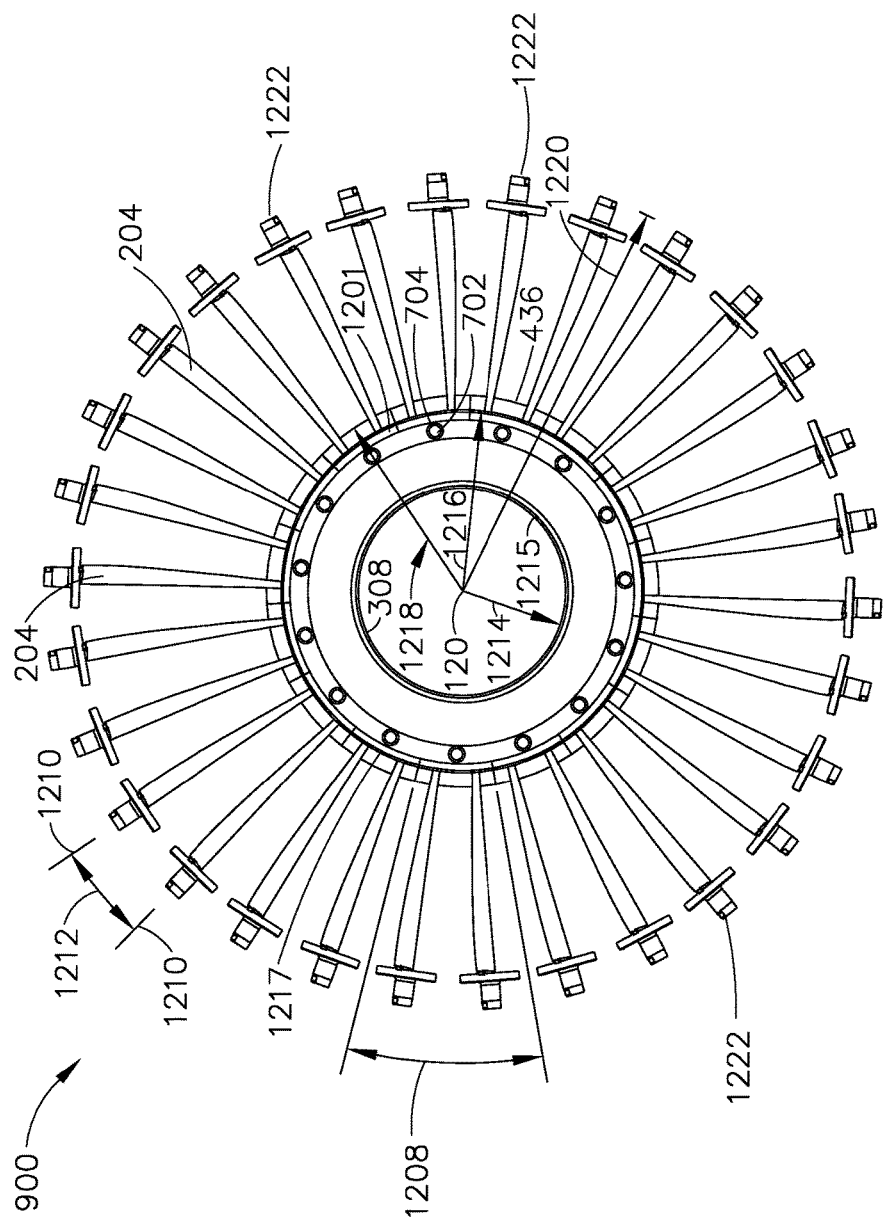
FIG. 12A is an axial aft-to-forward view of an exemplary shroud and baffle assembly with installed IGVs that may be used with the HPC shown in FIG. 2.

In operation, in the exemplary embodiment, bushing 1104 is inserted into right IGV slot 708 before IGV base peg 1102 is so inserted. With bushing lip 1106 present on bushing 1104, base bottom 1110 of base 902 is prevented from directly contacting floor 1108 of cylindrical recess 710. FIG. 12A is an axial aft-to-forward view an exemplary shroud and baffle assembly with installed IGVs that may be used with the HPC shown in FIG. 2. In FIG. 12A, fan hub frame 302, forward shroud 304, shroud 216, and baffle 306 are each shown as single annular pieces extending circumferentially about central axis 120. Together, annular fan hub frame 302, forward shroud 304, shroud 216, and baffle 306 form annular shroud and baffle assembly 300. Addition of a plurality of IGVs 204 to annular shroud and baffle assembly 300 forms an annular shroud and baffle assembly with installed IGVs 900. Component parts of sectors of shroud and baffle assembly with installed IGVs 900 are as shown and described above with reference to the foregoing figures. In other alternative embodiments, not shown, at least one of fan hub frame 302, forward shroud 304, shroud 216, and baffle 306 is not formed as a single annular piece, but rather as a plurality of sectors of a circumferential, i.e., annular, assembly, including, without limitation, in an interlocking sectors configuration. Also, in the exemplary embodiment, shroud and baffle assembly with installed IGVs 900 includes thirty IGVs 204. In alternative embodiments, not shown, shroud and baffle assembly with installed IGVs 900 includes other numbers of IGVs 204. Also, in the exemplary embodiment, bases 902 of IGVs 204 of each shroud and baffle assembly with installed IGVs 900 extend from a top side 1201.

Also, in the exemplary embodiment, annular shroud and baffle assembly with installed IGVs 900 is characterized by several radial dimensions. Shroud and baffle assembly with installed IGVs 900 includes a first inner radius 1214 defined by the distance from central axis 120 to a bottom side 1215, i.e., the surface facing central axis 120, including, without limitation, of rub coating 308. Shroud and baffle assembly with installed IGVs 900 also includes a second inner radius 1216 defined by the distance from central axis 120 to an upper aft edge 1217 of tapered overhang 316 (not shown in FIG. 12A). Shroud and baffle assembly with installed IGVs 900 further includes a first outer radius 1218 defined by the distance from central axis 120 to top forward corner 436 of fan hub frame 302 (not shown in FIG. 12A). Furthermore, shroud and baffle assembly with installed IGVs 900 also includes a second outer radius 1220 defined by the distance from central axis 120 to an outer tip 1222 of IGV 204.

Figure 12B:
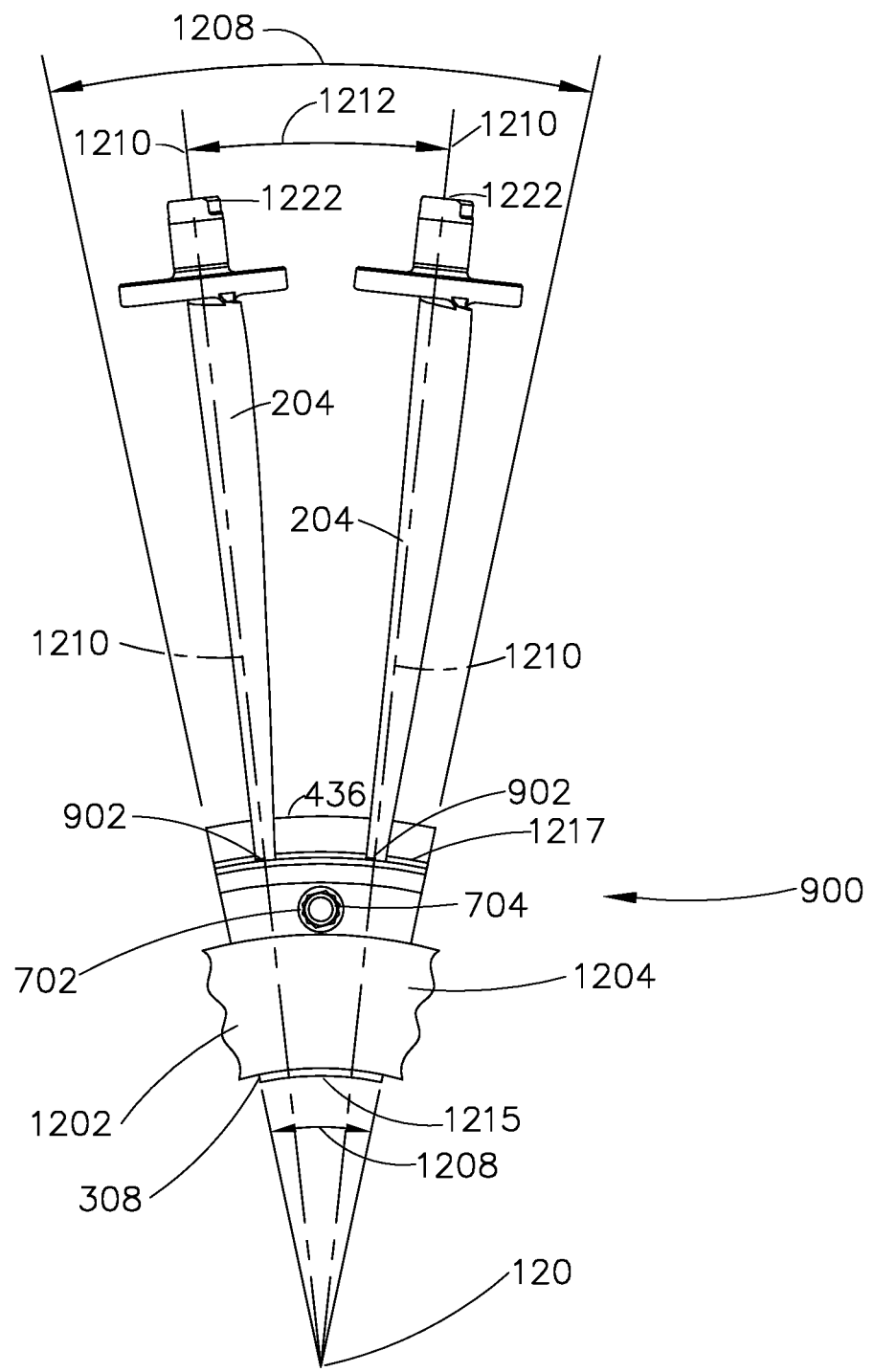
FIG. 12B is an axial aft-to-forward view of a sector of the exemplary shroud and baffle assembly with installed IGVs shown in FIG. 12A.

FIG. 12B is an axial horizontal aft-to-forward view of a sector of shroud and baffle assembly with installed IGVs shown in FIG. 12A. Shroud and baffle assembly with installed IGVs 900 and its component parts are as shown and described above with reference to the foregoing figures. In the exemplary embodiment, each sector of shroud and baffle assembly with installed IGVs 900 includes a left side 1202 and a right side 1204 angled relative to one another with respect to a central axis 120 by a predetermined first angle 1208 (also shown in FIG. 12A). Also, in the exemplary embodiment, first angle 1208 is 24° (24 degrees). First angle 1208 is determined by the relation (2*360°)÷(total number of IGVs 204 in shroud and baffle assembly with installed IGVs 900). In other alternative embodiments, not shown, shroud and baffle assembly with installed IGVs 900 includes other numbers of IGVs 204 and other values of first angle 1208. Likewise, IGV center axes 1210 of two IGVs 204 of each shroud and baffle assembly with installed IGVs 900 are angled relative to one another with respect to central axis 120 by a predetermined second angle 1212.

In operation, in the exemplary embodiments shown in FIGS. 12A and 12B, by varying the size of shroud and baffle assembly 300 and the number of IGVs 204 of shroud and baffle assemblies with installed IGVs 900, shroud and baffle assemblies with installed IGVs 900 may be manufactured and fitted for use in a variety of sizes and types of gas turbine engines 100 and HPCs 104.

Figure 13:
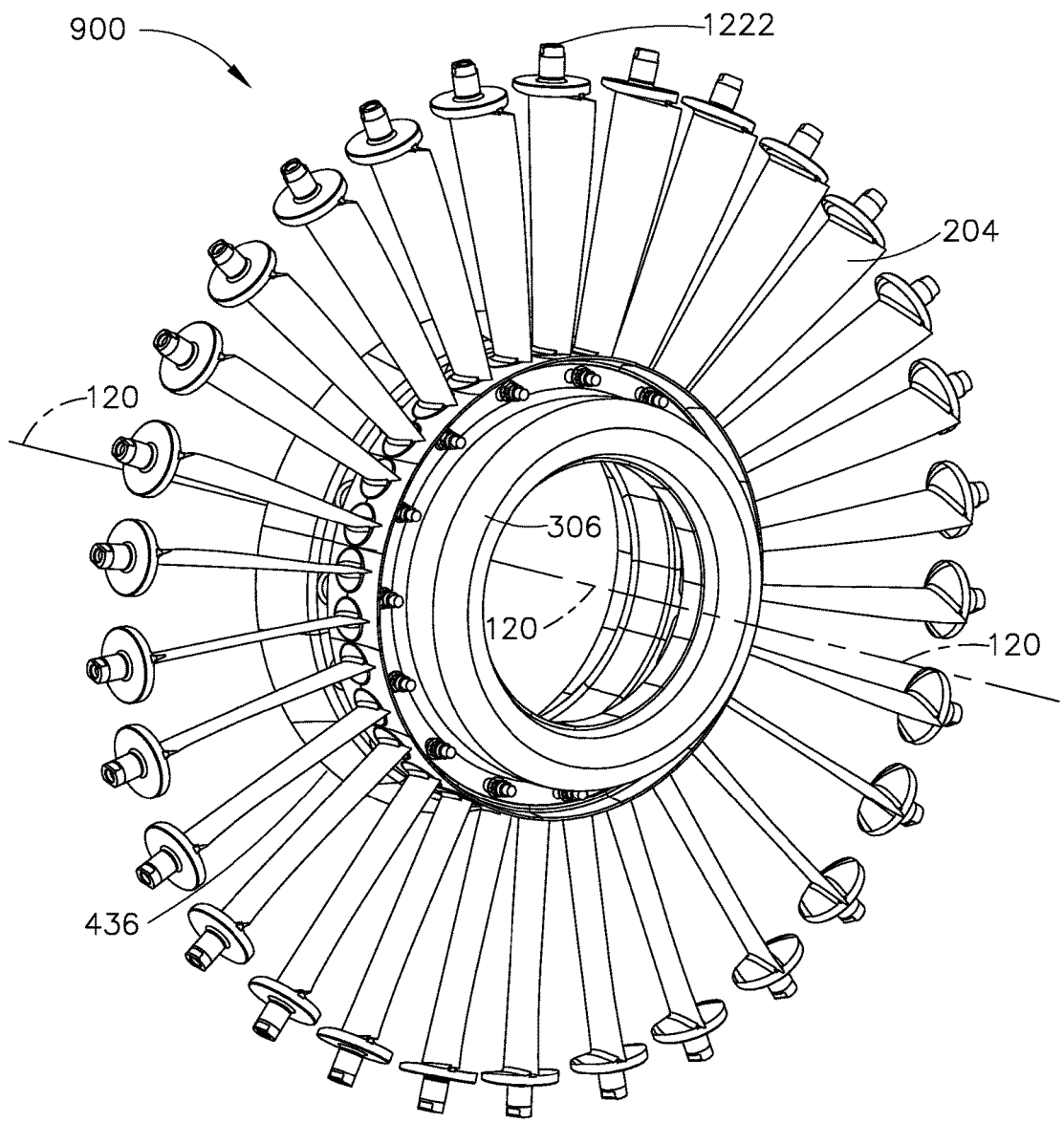

FIG. 13 is an aft-to-forward perspective view of the shroud and baffle assembly with installed IGVs shown in FIG. 12A. Shroud and baffle assembly with installed IGVs 900 and its component parts are as shown and described above with reference to the foregoing figures. In the exemplary embodiment, shroud and baffle assembly with installed IGVs 900 includes fan hub frame 302, forward shroud 304, shroud 216, and baffle 306 as single annular pieces extending circumferentially about central axis 120, as shown and described above with reference to FIG. 12A. Baffles 306 of each shroud and baffle assembly with installed IGVs 900 contain the aftmost facing surfaces of shroud and baffle assembly with installed IGVs 900, while top forward corners 436 contain the foremost facing points of shroud and baffle assembly with installed IGVs 900. Circumferential baffles 306 of shroud and baffle assembly with installed IGVs 900 extend into circumferential air-filled cavity 218, as shown and described above with reference to FIG. 3. Operation of the exemplary embodiment is as described above with reference to FIGS. 12A and 12B. Additional numbered features of shroud and baffle assembly with installed IGVs 900 are shown in FIG. 13 to facilitate cross-referencing FIG. 13 with prior figures.

Figure 14:
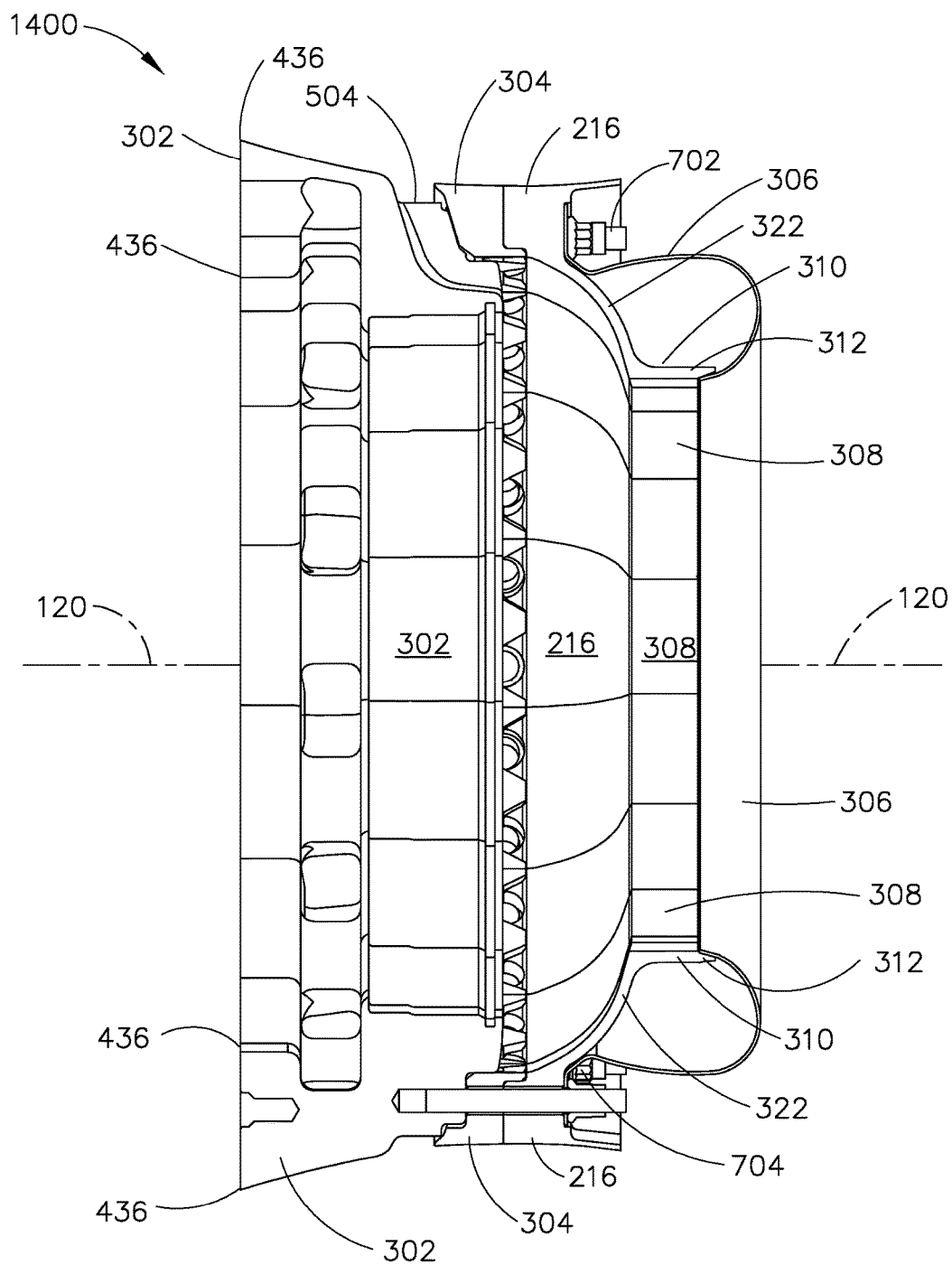

FIG. 14 is a side cut away view of a portion of the exemplary shroud and baffle assembly with installed IGVs shown in FIGS. 12A and 13. In the exemplary embodiment, installed IGVs 204 and baffle 306 are not shown. Component parts of a shroud and baffle assembly without baffles 1400 are as shown and described above with reference to the foregoing figures. In the exemplary embodiment, shroud bevels 312 contain the aftmost facing surfaces of shroud and baffle assembly without baffles 1400, while top forward corners 436 contain the foremost facing surfaces of shroud and baffle assembly without baffles 1400. Operation of the exemplary embodiment is as described above with reference to FIGS. 12A and 12B. Additional numbered features of shroud and baffle assembly without baffles 1400 are shown in FIG. 14 to facilitate cross-referencing FIG. 14 with prior figures.

The above-described embodiments of IGV shroud and baffle assembly effectively reduce vibration and turbulence in air-filled cavities present in gas turbine engines between the rotor stage and the stator stage, including space between IGVs and the first rotor of the rotor stage. Improved performance of gas turbine engines is further accomplished by the above-described IGV shroud and baffle assembly by separating a greater amount of air in such cavities from the flow paths relative to known shroud and baffle systems. Also, such enhanced performance of gas turbine engines is accomplished by the above-described IGV shroud and baffle assembly while maintaining conformance to strict requirements for shroud forward shape.

Example systems and apparatus of the IGV shroud and baffle assembly are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shroud and baffle assembly for a gas turbine engine, the gas turbine engine including a central axis, a fan assembly positioned at a forward end, and an exhaust outlet positioned at an aft end, said shroud and baffle assembly comprising:
  a shroud comprising a first end configured to couple to an annular support member of the gas turbine engine, a second end, a distal end comprising an axially aft extending lip, wherein said axially aft extending lip comprises a plurality of scallops, each scallop of said plurality of scallops comprising a cut away extending into at least a portion of said axially aft extending lip, said distal end further comprising a seal assembly configured to form a seal with an annular set of rotating teeth on a rotor of the gas turbine engine, said shroud further comprising an arcuate shroud body extending between said distal end and said second end, wherein said shroud extends circumferentially about the central axis; and
  a baffle coupled to an aft side of said shroud, said baffle comprising a radially outward end coupled to said aft side, a radially inward end coupled to said axially aft extending lip, and an arcuate baffle body extending therebetween, wherein said baffle extends circumferentially about the central axis.

2. The shroud and baffle assembly in accordance with claim 1, wherein said arcuate baffle body is concave with respect to the fan assembly.

3. The shroud and baffle assembly in accordance with claim 1, wherein said distal end extends axially aft from a radially inward end of said arcuate shroud body.

4. The shroud and baffle assembly in accordance with claim 1, wherein said arcuate shroud body is concave with respect to the fan assembly.

5. The shroud and baffle assembly in accordance with claim 1, wherein said axially aft extending lip comprises a shroud bevel formed on a radially inward surface of said axially aft extending lip concave with respect to the fan assembly, said radially inward surface of said axially aft extending lip and each scallop of said plurality of scallops comprising said shroud bevel.

6. The shroud and baffle assembly according to claim 1, wherein a radially outward surface of said shroud is configured to engage at least one inlet guide vane extending radially outward therefrom.

7. An inlet guide vane (IGV) assembly for a gas turbine engine, the gas turbine engine including a central axis, a fan assembly positioned at a forward end, and an exhaust outlet positioned at an aft end, said IGV assembly comprising:
- a shroud comprising a first end configured to couple to an annular support member of the gas turbine engine, a second end, a distal end comprising an axially aft extending lip, said distal end further comprising a seal assembly configured to form a seal with an annular set of rotating teeth on a rotor of the gas turbine engine, said shroud further comprising an arcuate shroud body extending between said distal end and said second end, wherein said shroud extends circumferentially about the central axis; and
- a baffle coupled to an aft side of said shroud, said baffle comprising a radially outward end coupled to said aft side, a radially inward end coupled to said axially aft extending lip, and an arcuate baffle body extending therebetween, wherein said baffle extends circumferentially about the central axis; and
- a plurality of IGVs separate from the annular support member, each IGV of said plurality of IGVs coupled to a radially outward surface of said shroud aft of the first end, wherein said radially outward surface is configured to engage at least one IGV of said plurality of IGVs thereto, wherein said plurality of IGVs are arranged radially about the central axis.

8. The IGV assembly in accordance with claim 7, wherein said arcuate baffle body is concave with respect to the fan assembly.

9. The IGV assembly in accordance with claim 7, wherein said distal end extends axially aft from a radially inward end of said arcuate shroud body.

10. The IGV assembly in accordance with claim 7, wherein said arcuate shroud body is concave with respect to the fan assembly.

11. The IGV assembly in accordance with claim 7, wherein said axially aft extending lip comprises a shroud bevel and a plurality scallops, said shroud bevel formed on a radially inward surface of said axially aft extending lip concave with respect to the fan assembly, each scallop of said plurality of scallops comprising a cut away extending into at least a portion of said axially aft extending lip, and said radially inward surface of said axially aft extending lip and each scallop of said plurality of scallops comprising said shroud bevel.

12. The IGV assembly according to claim 11, wherein the radially outward surface of said shroud is configured to engage at least one inlet guide vane extending radially outward therefrom.

13. The IGV assembly in accordance with claim 7, wherein said second end comprises an overhang and a radially outward aft corner, said overhang extending axially aft from said radially outward aft corner.

14. A gas turbine engine including a central axis, a fan assembly positioned at a forward end, and an exhaust outlet positioned at an aft end, said gas turbine comprising:
- a core engine comprising a compressor, a combustor, and a turbine coupled in a serial flow relationship;
- a power engine comprising a fan and a power turbine coupled together on a common shaft, said power engine coaxial with said core engine;
- a shroud and baffle assembly comprising:
  - a shroud comprising a first end configured to couple to an annular support member of the gas turbine engine, a second end, a distal end comprising an axially aft extending lip, wherein said axially aft extending lip comprises a plurality of scallops, each scallop of said plurality of scallops comprising a cut away extending into at least a portion of said axially aft extending lip, said distal end further comprising a seal assembly configured to form a seal with an annular set of rotating teeth on a rotor of said gas turbine engine, said shroud further comprising an arcuate shroud body extending between said distal end and said second end; and
  - a baffle coupled to an aft side of said shroud, said baffle comprising a radially outward end coupled to said aft side, a radially inward end coupled to said axially aft extending lip, and an arcuate baffle body extending therebetween, said baffle extending aftward into an annular space of said gas turbine engine; and
- a plurality of inlet guide vanes (IGVs), each IGV of said plurality of IGVs coupled radially to and between a radially outward surface of said shroud and a radially inward surface of an annular housing of said compressor, wherein said shroud, said baffle, said plurality of IGVs, and said annular housing are arranged circumferentially about the central axis.

15. The gas turbine engine in accordance with claim 14, wherein said arcuate baffle body is concave with respect to the fan assembly.

16. The gas turbine engine in accordance with claim 14, wherein said distal end extends axially aft from a radially inward end of said arcuate shroud body.

17. The gas turbine engine in accordance with claim 14, wherein said arcuate shroud body is concave with respect to the fan assembly.

18. The gas turbine engine in accordance with claim 14, wherein said axially aft extending lip comprises a shroud bevel formed on a radially inward surface of said axially aft extending lip concave with respect to the fan assembly, said radially inward surface of said axially aft extending lip and each scallop of said plurality of scallops comprising said shroud bevel.

19. The gas turbine engine in accordance with claim 18, wherein said radially outward surface of said shroud is configured to engage at least one inlet guide vane extending radially outward therefrom.

20. The gas turbine engine in accordance with claim 18, wherein said second end comprises an overhang and a radially outward aft corner, said overhang extending axially aft from said radially outward aft corner, wherein said overhang covers at least a portion of a radially inward axially boundary of the annular space of said gas turbine engine.

* * * * *